US011947871B1

(12) United States Patent
Fisher-Stawinski et al.

(10) Patent No.: US 11,947,871 B1
(45) Date of Patent: Apr. 2, 2024

(54) SPATIALLY AWARE VIRTUAL MEETINGS

(71) Applicant: International Business Machines Corporation, Armonk, NY (US)

(72) Inventors: Steven Lee Fisher-Stawinski, Buffalo Grove, IL (US); Shikhar Kwatra, San Jose, CA (US); Moitreyee Mukherjee-Roy, San Jose, CA (US); Scott E. Schneider, Rolesville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/299,865

(22) Filed: Apr. 13, 2023

(51) Int. Cl.
*G06F 3/16* (2006.01)
*G06F 3/01* (2006.01)
*G06T 11/00* (2006.01)
*G10L 15/22* (2006.01)
*H04S 7/00* (2006.01)

(52) U.S. Cl.
CPC .............. *G06F 3/165* (2013.01); *G06F 3/013* (2013.01); *G06F 3/017* (2013.01); *G06T 11/00* (2013.01); *G10L 15/22* (2013.01); *H04S 7/303* (2013.01); *H04S 2400/11* (2013.01); *H04S 2400/15* (2013.01)

(58) Field of Classification Search
CPC .......... G06F 3/165; G06F 3/013; G06F 3/017; G06T 11/00; G10L 15/22; H04S 7/303; H04S 2400/11; H04S 2400/15
USPC ......................................................... 345/156
See application file for complete search history.

(56) References Cited

U.S. PATENT DOCUMENTS

| 9,967,518 | B2 | 5/2018 | Mukai |
| 10,516,853 | B1 | 12/2019 | Gibson |
| 2005/0280701 | A1 | 12/2005 | Wardell |
| 2006/0104458 | A1 | 5/2006 | Kenoyer |
| 2009/0240359 | A1 | 9/2009 | Hyndman |
| 2010/0328419 | A1 | 12/2010 | Etter |

(Continued)

OTHER PUBLICATIONS

"How to Make a PNG Image Rotate Three-Dimensionally In a DaVinci Resolve", accessed on Apr. 13, 2023, YouTube, 7 pages, <https://www.youtube.com/watch?v=LZr4ayi1v18>.

(Continued)

*Primary Examiner* — Mark Edwards
(74) *Attorney, Agent, or Firm* — Michael O'Keefe (57) ABSTRACT

According to one embodiment, a method, computer system, and computer program product for spatially aware virtual meetings is provided. The embodiment may include establishing a virtual conference room and connections thereto by a speaking participant, an addressee participant, and a non-addressee participant. The embodiment may also include assigning the speaking participant, the addressee participant, and the non-addressee participant to positions in a virtual space. The embodiment may further include displaying a virtual output stream of the virtual space to a viewing participant on a user device display screen. The embodiment may also include determining that a speaking participant is directing a speech segment to an addressee participant. The embodiment may further include altering at least one of the visual output stream and an audio output stream for a viewing participant based at least on the positions of the speaking participant and the addressee participant.

20 Claims, 4 Drawing Sheets

(56) References Cited

U.S. PATENT DOCUMENTS

| | | |
|---|---|---|
| 2012/0281059 A1 | 11/2012 | Chou |
| 2013/0055112 A1* | 2/2013 | Joseph ................ H04L 12/1827 715/758 |
| 2016/0140396 A1 | 5/2016 | Feng |
| 2017/0123752 A1* | 5/2017 | Nadler .................. G06T 13/205 |
| 2022/0014868 A1* | 1/2022 | Binn ........................ H04S 7/303 |
| 2022/0028366 A1* | 1/2022 | Kephart .................. G10L 15/26 |
| 2022/0197403 A1* | 6/2022 | Hughes .................. G06F 3/011 |
| 2023/0051409 A1* | 2/2023 | Du ........................... H04N 7/15 |

OTHER PUBLICATIONS

"Simple CSS 3D Rotate Animation", accessed on Apr. 13, 2023, 2 pages, <https://codepen.io/sungaila/pen/LzMgjE>.

Authors et al., Disclosed Anonymously, "Teleconference support system by assigning the direction of the sound source", An IP.com Prior Art Database Technical Disclosure, IP.com No. IPCOM000270289D, IP.com Electronic Publication Date: Jun. 24, 2022, 6 Pages.

Billinghurst et al., "A Wearable Spatial Conferencing Space", Conference: Wearable Computers, IEEE Xplore, Nov. 1998, 8 Pages.

Esposito, Filipe, "iOS 15 and macOS Monterey simulate Spatial Audio for non-Dolby content with new 'Spatialize Stereo' option", 9to5Mac, Jun. 8, 2021, 5 Pages.

Poore, Jim, "Spatial Audio—A Game Changer in Conferencing", Immersitech Blog, Apr. 27, 2021, 4 Pages.

Warren, Tom, "Microsoft Teams' new Together Mode is designed for pandemic-era meetings", The Verge, Jul. 8, 2020, 5 Pages.

\* cited by examiner

SPATIALLY AWARE VIRTUAL MEETINGS

BACKGROUND

The present invention relates generally to the field of computing, and more particularly to web conferencing.

Web conferencing, including but not limited to audio conferencing and video conferencing, may relate to any communication between two or more individuals over a network, such as the Internet, where the participating members utilize audio and/or video streams. Web conferencing allows for a dynamic interface between users in separate locations to efficiently communicate as if they were in person by allowing real-time face-to-face audio and video interactions through the use of communicatively coupled cameras and microphones and the sharing of files between participating users through data transmission through a communication network. Popular web conferencing applications include Zoom® (Zoom and all Zoom-based trademarks and logos are trademarks or registered trademarks of Zoom Video Communications Inc. and/or its affiliates), Webex® (Webex and all Webex-based trademarks and logos are trademarks or registered trademarks of Webex Communications, Inc. and/or its affiliates), GoToMeeting® (GoToMeeting and all GoToMeeting-based trademarks and logos are trademarks or registered trademarks of Citrix Online, LLC. and/or its affiliates), and FaceTime® (Facetime and all Facetime-based trademarks and logos are trademarks or registered trademarks of Apple Inc. and/or its affiliates) among others.

SUMMARY

According to one embodiment, a method, computer system, and computer program product for spatially aware virtual meetings is provided. The embodiment may include establishing a virtual conference room and connections thereto by a speaking participant, an addressee participant, and a non-addressee participant. The embodiment may also include assigning the speaking participant, the addressee participant, and the non-addressee participant to positions in a virtual space. The embodiment may further include displaying a virtual output stream of the virtual space to a viewing participant on a user device display screen, where the viewing participant is selected from a group consisting of the speaking participant, the addressee participant, and the non-addressee participant, and where the visual output stream comprises a schematic visual representation of the virtual space from the viewing participant's spatial perspective that is configured to be displayed in a two-dimensional viewport from a fixed perspective. The embodiment may also include determining that the speaking participant is directing a speech segment to the addressee participant. The embodiment may further include altering at least one of the visual output stream and an audio output stream for the viewing participant based at least on the positions of the speaking participant and the addressee participant.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to web conferencing. The following described exemplary embodiments provide a system, method, and program product to, among other things, generating a graphical user interface of a web conference that depicts avatars of participants at angles relative to the user and projects audio corresponding to the virtual space location of each other participant. Therefore, the present embodiment has the capacity to improve the technical field of web conferencing by generating a virtual space more characteristic of an in-person meeting without requiring in-person attendance.

As previously described, web conferencing, including but not limited to audio conferencing and video conferencing, may relate to any communication between two or more individuals over a network, such as the Internet, where the participating members utilize audio and/or video streams. Web conferencing allows for a dynamic interface between users in separate locations to efficiently communicate as if they were in person by allowing real-time face-to-face audio and video interactions through the use of communicatively coupled cameras and microphones and the sharing of files between participating users through data transmission through a communication network. Popular web conferencing applications include Zoom®, Webex®, GoToMeeting®, and FaceTime® among others.

In the field of online meeting software, users experience reduced experiential fidelity relative to meeting in person due, in part, to the lack of spatial simulation in online meetings or conferences. More specifically, in an in-person meeting, participants communicate using their physical spatial interrelationships to communicate by looking directly at, and directing their voice toward, another participant when directly addressing that participant. This method of communication can cause the recipient to hear the voice with increased volume, clarity, and directionality compared to hearing the same words directed to someone else in the conference. By contrast, typical online conferencing technology removes this kind of spatial information from the experience by presenting all voices flatly to each participant via the participant's audio hardware. Current technologies attempting to solve this issue often require heavy wearables to track speaker attention and, accordingly, are not widely used due to such restrictions. As such, it may be advantageous to, among other things, develop spatially aware web conferencing and the benefits conveyed by such technology.

According to at least one embodiment, a spatially aware virtual meeting program may identify a speaker and an addressee in a conversation during a web conference using a combination of detection techniques. The spatially aware virtual meeting program may detect the direction of a user's speech by sensing the user's gaze, head, and/or mouth position via a camera communicatively coupled to a user computing device through, by content via speech recognition, by detecting a gesture of the speaker via the camera or a wearable device, or by allowing the user to manually input to whom their speech is addressed. For example, the spatially aware virtual meeting program may allow a user to click or select on another participant's video or avatar. The spatially aware virtual meeting program may allow the choice of positions to be arbitrary, random, chosen by the host participant, or chosen by guest participants. However, the spatially aware virtual meeting program may configure the positions to be the same for all participants.

Furthermore, the spatially aware virtual meeting program may render each user's interface by visually arranging the other users' video feeds and/or still avatars according to their spatial positions. For example, the spatially aware virtual meeting program may orient each avatar and/or video feed around a schematic representation of a meeting, such as a cartoon rendering of a conference table, and processing the audio in accordance with the same virtual positioning. Based on the speaking participant, the spatially aware virtual meeting program may provide spatial audio via differential stereo channels either via integrated or peripheral headphones or speakers, which many web conferencing software allows. Additionally, the spatially aware virtual meeting program may not only simulate each user's voice as emanating from the user's respective virtual location but also simulate a virtual direction toward which the user is speaking. Therefore, users being addressed may hear audio processed to elevate the directedness, volume, and clarity of what they are hearing, and users who are not the direct addressee may hear audio processed to sound less direct, but still directional in the direction of the speaker.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
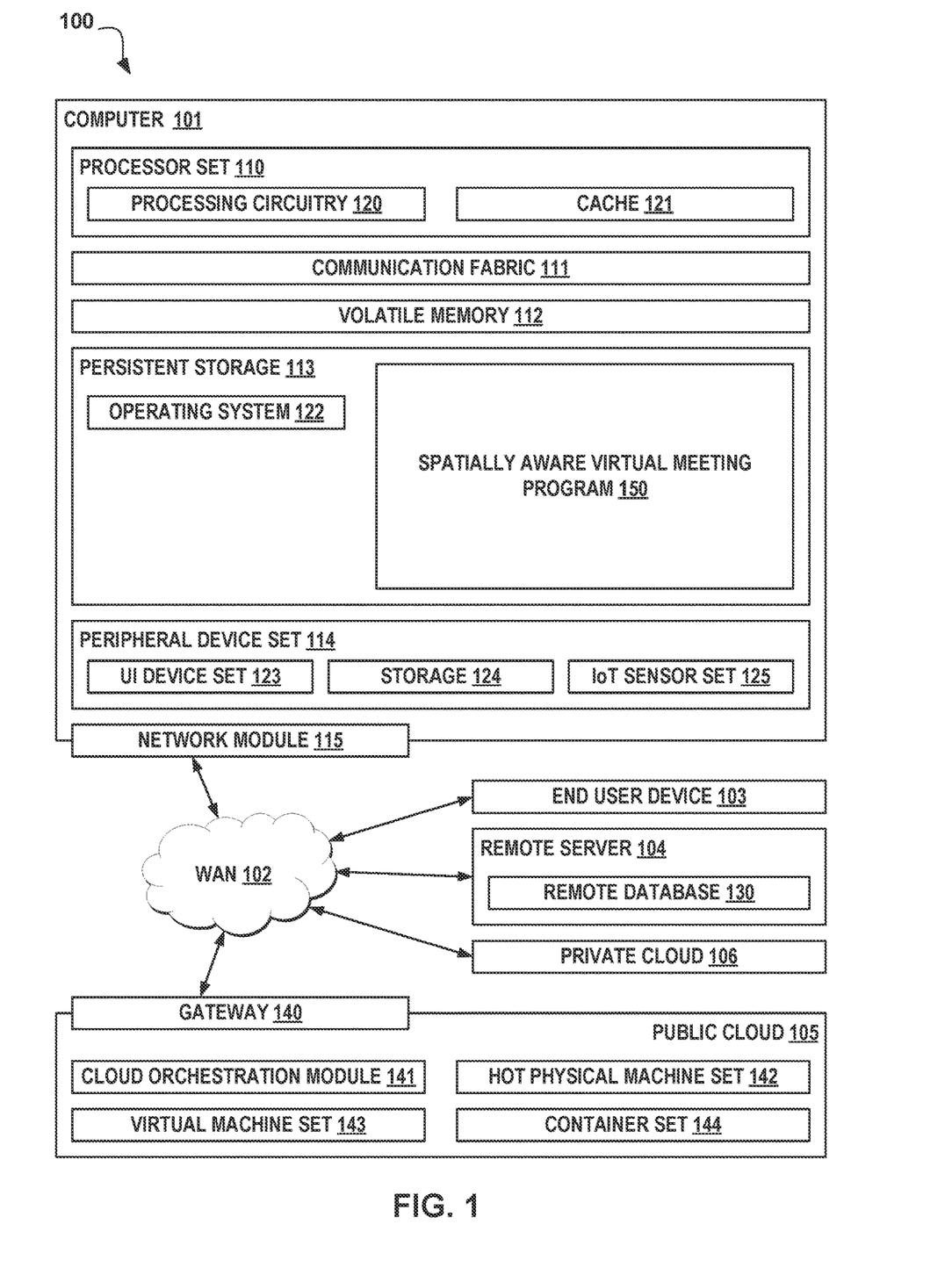
FIG. 1 illustrates an exemplary networked computer environment according to at least one embodiment.

Referring now to FIG. 1, computing environment 100 contains an example of an environment for the execution of at least some of the computer code involved in performing the inventive methods, such as spatially aware virtual meeting program 150. In addition to spatially aware virtual meeting program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and spatially aware virtual meeting program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in spatially aware virtual meeting program 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in spatially aware virtual meeting program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to at least one embodiment, the spatially aware virtual meeting program 150 may generate a graphical user interface where each web conference participant's avatar or video feed is positioned around a virtual space (e.g., a conference table). The spatially aware virtual meeting program 150 may position each web conference participant's avatar or video feed around the virtual space arbitrarily, randomly, or based on user preconfigured preferences. However, the spatially aware virtual meeting program 150 may ensure each participant has the same position in the virtual space from which their individual perspective is generated.

The spatially aware virtual meeting program 150 may utilize a standard display monitor, a standard webcam or other photographic capture device, and a stereo audio output device (e.g., integrated speakers or headphones). In at least one embodiment, the spatially aware virtual meeting program 150 may utilize motion or position-sensing hardware integrated into a headset, wearable devices, and haptic and/or touch feedback devices. In another embodiment, the spatially aware virtual meeting program 150 may also utilize a standard monaural microphone device that may be either standalone or integrated in a headset or photographic capture device.

Additionally, the spatially aware virtual meeting program 150 may, through various sensing technologies, determine a user's head position, gestures, and/or gaze through a photographic capture device and/or a wearable sensor. The spatially aware virtual meeting program 150 may process the audio feed of each web conference participant to appear as if the audio feed is originating from the location at which each web conference participant avatar or video feed is appearing within the virtual space. The spatially aware virtual meeting program 150 may further change the audio balance to provide audible indication of the speaker's virtual position based on who is speaking, the speaker's virtual position, and the position of the user's head and/or the user's gaze. Furthermore, notwithstanding depiction in computer 101, the spatially aware virtual meeting program 150 may be stored in and/or executed by, individually or in any combination, end user device 103, remote server 104, public cloud 105, and private cloud 106. The spatially aware virtual meeting method is explained in more detail below with respect to FIGS. 2-4.

Figure 2:
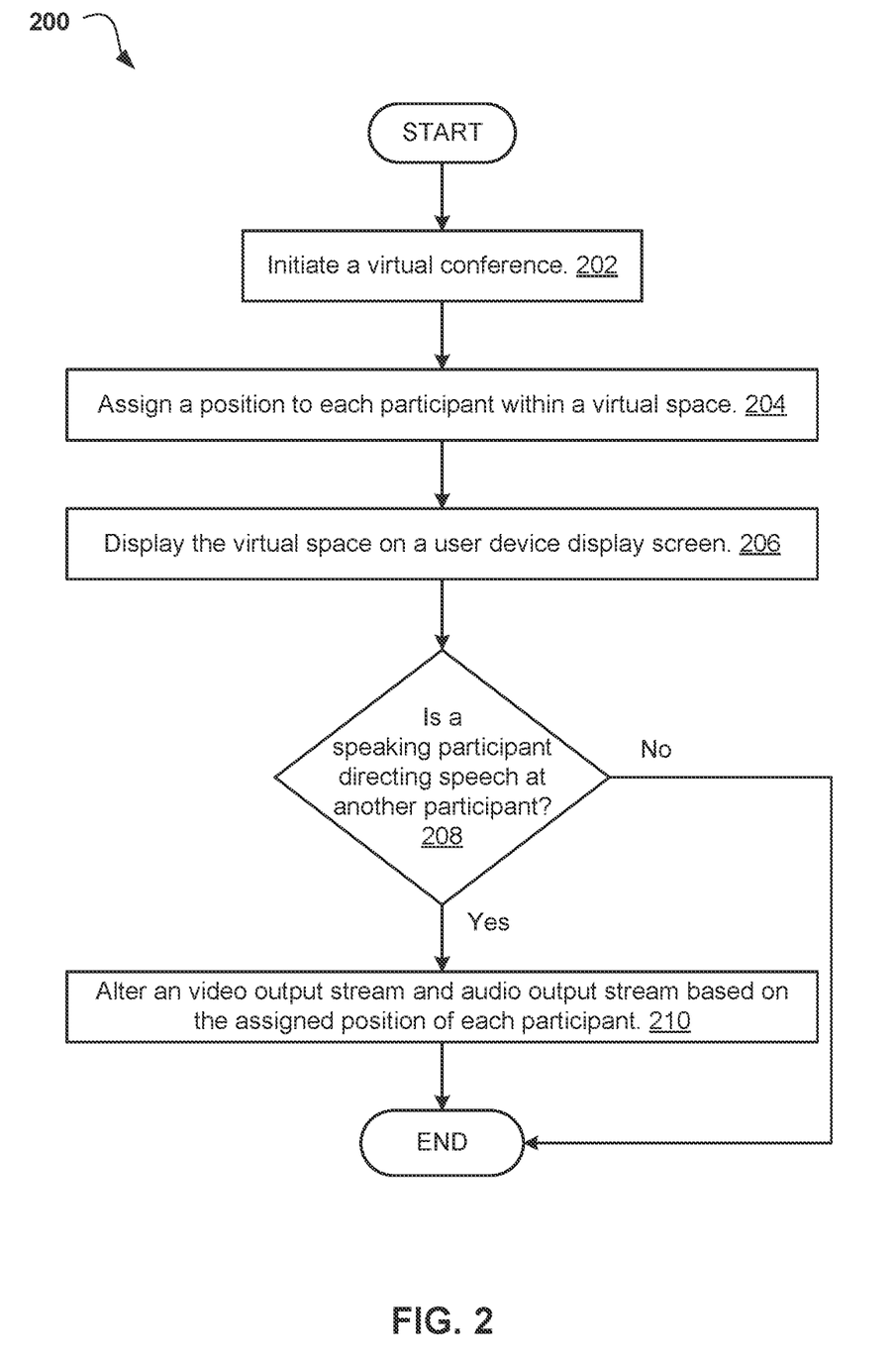
FIG. 2 illustrates an operational flowchart for a spatially aware virtual meeting process according to at least one embodiment.

Referring now to FIG. 2, an operational flowchart illustrating a spatially aware virtual meeting process 200 is depicted according to at least one embodiment. At 202, the spatially aware virtual meeting program 150 initiates a virtual conference. Upon receiving interactions from a host participant (e.g., a calendar invitation notification or a user selection to a graphical user interface to start a web conference), the spatially aware virtual meeting program 150 may initiate the virtual conference in a web conferencing program through generation of a conference room and admittance of each participant in a virtual waiting room awaiting entry to the virtual conference.

In one or more embodiments, the spatially aware virtual meeting program 150 may also generate a virtual space, upon initiating the web conference, in which each participant may be placed when the virtual conference is initiated. The virtual space may represent any area around which avatars or video feeds of each virtual conference participant may be assigned a location by the spatially aware virtual meeting program 150. For example, the spatially aware virtual meeting program 150 may generate the virtual space as a meeting room with a conference table and chairs where the avatar or video feed of each participant is assigned to a chair. In one or more other embodiments, the virtual space may be within the metaverse.

Each virtual space may be preconfigured with a specific number of participant assignments in order to ensure even distribution and spacing of each participant so as to avoid overcrowding the virtual space. For example, a small breakout conference room may include a square four-person table that allows one participant at each side of the table. Similarly, a medium conference room may include an ovular, 15-person conference table.

Then, at 204, the spatially aware virtual meeting program 150 assigns a position to each participant within a virtual space based on the preconfigured space assignments available within the virtual space. Upon each participant entering, or receiving admittance to, the virtual conference, the spatially aware virtual meeting program 150 may assign a position to each participant within the virtual space. As previously described, the virtual space may be any area around which avatars or video feeds of each virtual conference participant may be assigned a location by the spatially aware virtual meeting program 150. In one or more embodiments, the spatially aware virtual meeting program 150 may assign the position to each participant based on each participant's role within the web conference, role within the organization, knowledge of the subject matter being presented, and/or whether the participant is represented by an avatar or a video feed. For example, if the virtual space is a conference table, the spatially aware virtual meeting program 150 may place the host at the head of the conference table and a team supervisor juxtaposed to the host participant. Similarly, if the virtual space is a convention stage, the spatially aware virtual meeting program 150 may place each speaking participant on the stage while each attending participant may be spaced within a gallery with a view of the stage.

In at least one other embodiment, the spatially aware virtual meeting program 150 may allow each participant to choose their position in the virtual space from the available spaces remaining when the participant enters the web conference. In at least one other embodiment, the spatially aware virtual meeting program 150 may automatically determine the position in the web conference appropriate for a participant based on preconfigured settings. For example, the user may preconfigure position settings to indicate that they always wish to be the closest to the host participant as possible when joining a virtual meeting. Similarly, a user may preconfigure the spatially aware virtual meeting program 150 to seat them further away when they have their video feed turned on but closer when they are represented as an avatar.

Next, at 206, the spatially aware virtual meeting program 150 displays the virtual space on a user device display screen. Once the spatially aware virtual meeting program 150 has assigned each participant to a position in the virtual space, the spatially aware virtual meeting program 150 may display the virtual space, with the avatar or video feed of each assigned participant, on a graphical user interface of a user device display screen. The display for each participant may represent the perspective the specific participant would have in a real-world space should the participant be physically present in that space. For example, if the spatially aware virtual meeting program 150 assigns a host participant to the head of a conference table and a guest participant attending the conference on the host participant's left, the spatially aware virtual meeting program 150 may display the virtual space on the host participant's user device display screen with the guest participant to the host's left. From the guest participant's perspective, however, the host participant may appear on the guest participant's right based on the positions within the virtual space assigned by the spatially aware virtual meeting program 150.

Then, at 208, the spatially aware virtual meeting program 150 determines whether the speaking participant is directing speech at another participant. During a virtual conference, the spatially aware virtual meeting program 150 may monitor interactions between conference participants. Throughout the virtual conference, various participants may speak to the other participants as a whole or directly to a subset of the other participants, including directly speaking to a single participant. The spatially aware virtual meeting program 150 may determine a speaking user is directing speech content to specific participants through various technologies, such as, but not limited to, determining a user's head position, gesture recognition, and/or gaze detection through one or more photographic capture devices and/or wearable sensors. For example, the spatially aware virtual meeting program 150 may utilize a motion-detecting sensor in a user headset to determine the user is directing speech to the avatar on the left side of the user device display screen. In one or more embodiments, the spatially aware virtual meeting program 150 may allow for determining the user at whom speech is directed through speech recognition, speech-to-text, and/or natural language processing. For example, the spatially aware virtual meeting program 150 may identify that a speaking user begins a line of speech with a user's name, such as "David, how are you doing today?". The spatially aware virtual meeting program 150 may determine, based on the name "David" the speaking user is directing speech to a participant with the name "David" and, through natural language processing techniques, identify the specific user toward whom the speech is directed. In another embodiment, the spatially aware virtual meeting program 150 may determine speech is directed to a specific individual based on the responsibilities or role of that individual. For example, if a speaking participant is requesting an update on a team project, the spatially aware virtual meeting program 150 may understand that speech is directed toward a specific participant charged with managing the team project.

If the spatially aware virtual meeting program 150 determines the speaking participant is directing speech at another participant (step 208, "Yes" branch), then the spatially aware virtual meeting process 200 may proceed to step 210 to alter the video output stream and audio output stream based on the assigned position of each participant. If the spatially aware virtual meeting program 150 determines the speaking participant is not directing speech at another participant (step 210, "No" branch), then the spatially aware virtual meeting process 200 may return to step 206 to display the virtual space on the user device display screen.

Next, at 210, the spatially aware virtual meeting program 150 alters the video output stream and audio output stream based on the assigned position of each participant. The spatially aware virtual meeting program 150 may alter the video output stream and the audio output stream in one of various modification techniques.

In at least one embodiment, with respect to modifications to the audio output stream, the spatially aware virtual meeting program 150 may modify the audio feed to appear as if the source of the audio is the location of the speaking participant in the virtual space. For example, in a round table virtual space with three participants positioned to the user's left, center, and right, the spatially aware virtual meeting program 150 may modify the audio stream to appear as if the segment of audio spoken by the participant to the user's left is generated from the left of the user device display screen or from the position of the user device display screen at which the leftmost participant's avatar or video stream is positioned. The spatially aware virtual meeting program 150 may modify the sound source by altering the audio balance of the user's device speakers based on one or more of the speaking participant, the speaking participant's virtual position, and the position of the user's head and/or gaze as determined from a user device camera.

In one or more other embodiments, the spatially aware virtual meeting program 150 may modify the speaking participant's output audio stream to another participant who is being directly addressed by the speaking participant's speech to elevate the directedness, volume, and clarity of what they are hearing. Conversely, participants who are not the direct addressees of the speaking participant's speech may hear audio processed to sound less direct but still directional toward the speaker.

In at least one other embodiment, with respect to modifications to the video output stream, the spatially aware virtual meeting program 150 may change the perspective of the graphical user interface displayed on the user device display screen based on the detected user head position and/or gaze direction. For example, the spatially aware virtual meeting program 150 may pan the view of the user device display screen to the leftmost participant in the virtual space when that participant is speaking.

Furthermore, the spatially aware virtual meeting program 150 may alter the video output stream for each participant in real-time to reflect the viewing direction of each participant. For example, if the host participant is speaking and each participant is directing their attention to that participant, the spatially aware virtual meeting program 150 may show an avatar for each individual looking at the host participant's avatar. However, if a different participant begins speaking and each meeting participant changes their gaze direction to the different participant, the spatially aware virtual meeting program 150 may change the video output stream of each participant to show their respective avatars directing attention to the different participant.

Additionally, the spatially aware virtual meeting program 150 may monitor one or more gestures made by the user during the conference and replicate those gestures on the user avatar represented in the virtual space. For example, if the user is an animated speaker that frequently uses their hands when speaking, the spatially aware virtual meeting program 150 may replicate any user hand gestures on the user avatar within the virtual space for the other participants to view.

Figure 3:
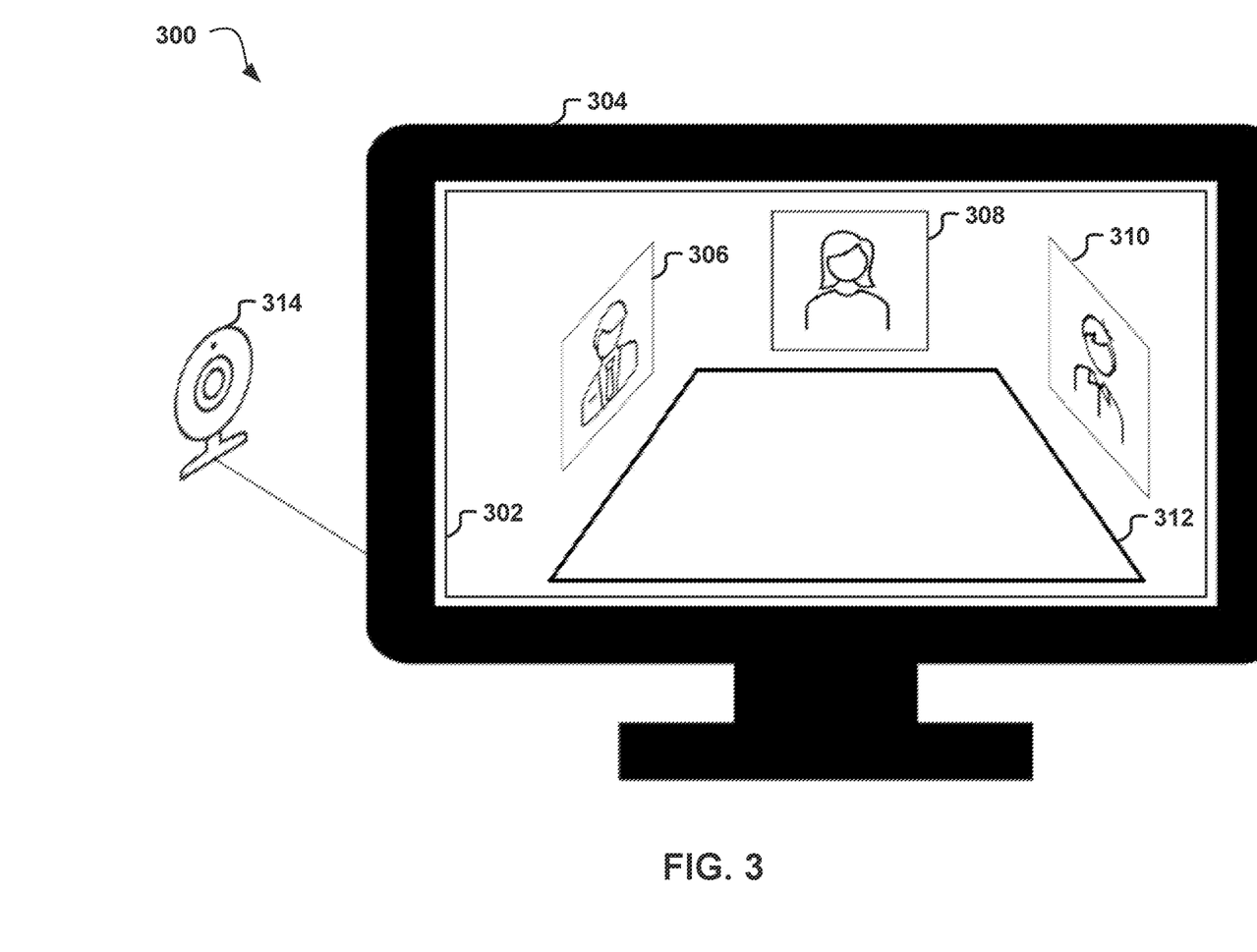
FIG. 3 is an exemplary block diagram of a spatially aware virtual meeting user interface according to at least one embodiment.

Referring now to FIG. 3, an exemplary block diagram of a spatially aware virtual meeting user interface 300 is depicted according to at least one embodiment. During a virtual conference, the spatially aware virtual meeting program 150 may generate and display a graphical user interface 302 on a user device display screen 304 that depicts each other participant 306-310 of the web conference. The spatially aware virtual meeting program 150 may position each participant 306-310 around a virtual space and the perspective each participant 306-310 sees across their respective user device display screens 304 may be a first-person view that user would have in a real-world representation of the virtual space. Furthermore, the spatially aware virtual meeting program 150 may depict each participant 306-310 as either a preconfigured avatar of the respective user or a video feed as captured by each user's respective camera 314, either integrated in or communicatively coupled to the user device. In one or more embodiments, the spatially aware virtual meeting program 150 may angle one or more avatars or video feeds to accurately depict how each individual 306-310 would appear would they be in a real-world environment of the virtual space. For example, users 306 and 310 may be angled in respect to the user at a virtual conference table 312. Since the avatar or video feed for each participant may be a two-dimensional image represented in the three-dimensional virtual space, the spatially aware virtual meeting program 150 may utilize various modeling software platforms, such as Da Vinci Resolve® (Da Vinci Resolve® and all Da Vinci Resolve-based trademarks and logos are trademarks or registered trademarks of Blackmagic Design Pty. Ltd. and/or its affiliates) or CSS.

Additionally, the spatially aware virtual meeting program 150 may utilize audio balancing to modify an audio feed to appear as if the audio source is the displayed avatar or video feed for the speaking user. For example, if a participant 306 is speaking, the spatially aware virtual meeting program 150 may modify the audio feed emitted from the user's speakers so the audio appears to be originating from the avatar of the speaking participant 306.

Figure 4:
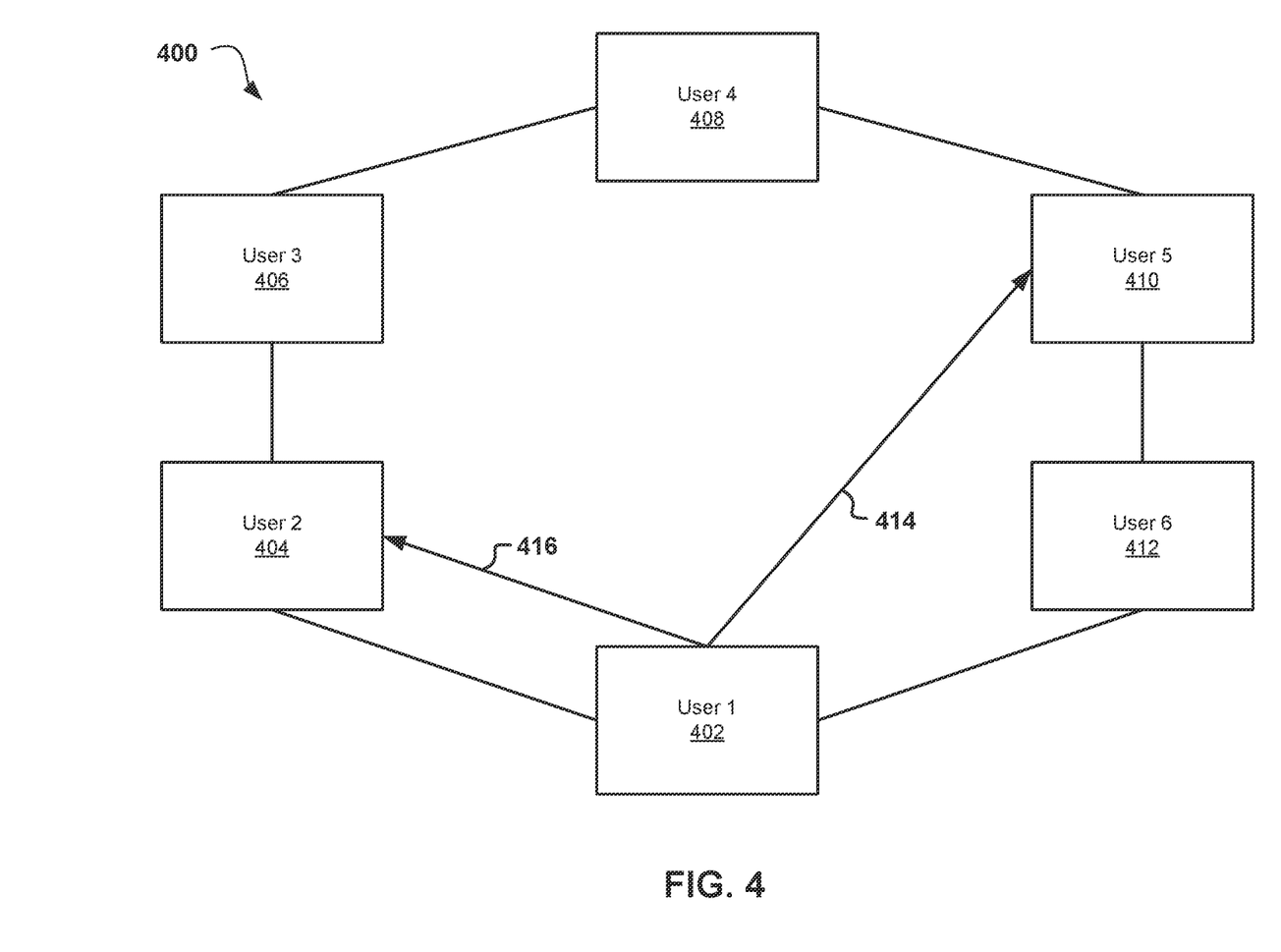
FIG. 4 is a block diagram of sound generation during a spatially aware virtual meeting according to at least one embodiment.

Referring now to FIG. 4, a block diagram of sound generation 400 during a spatially aware virtual meeting is depicted according to at least one embodiment. As previously described, the spatially aware virtual meeting program 150 may modify audio output from one or more user device speakers, such as through audio balancing, to alter the perceived source of audio conveyed from one participant to one or more other participants during a virtual conference. The sound generation block diagram 400 is a top-down view of the virtual space generated by the spatially aware virtual meeting program 150 in step 202 and after positions for each user 402-412 have been assigned.

In an embodiment when User 1 402 is speaking directly to User 5 410, the spatially aware virtual meeting program 150 may modify the audio output stream for each user (i.e., Users 402-412) to appear that the audio output stream is originating from the position of User 1 402 on each user's respective graphical user interface. For example, at 414, User 5 410 may have the audio originating from the location of User 1 402 to the left orientation of the device display screen for User 5 410 since User 1 402 is positioned to the left of User 5 410 in the virtual space. Similarly, at 416, User 2 404 may have the audio of User 1 402 originating from the position of User 1 402 to the right orientation of the device display screen for user 2 404 since User 1 402 is positioned to the right of User 2 404 in the virtual space.

In either embodiment however, if the spatially aware virtual meeting program 150 allows for face and/or gaze tracking to pan the graphical user interface presented to each user based on the direction or participant at whom the current user is looking, the spatially aware virtual meeting program 150 may dynamically alter the audio output stream to consistently originate from the speaking user. For example, if User 1 402 is speaking during the previously described virtual conference and User 2 404 changes attention between User 1 402 and User 5 410, the spatially aware virtual meeting program 150 may keep the audio output streams source at the position of User 1 402 regardless of which other user in the virtual conference User 2 404 may be looking at while User 1 402 is speaking. As such, the spatially aware virtual meeting program 150 may pan the audio source around the virtual space based on the specific user's attention location similar to how a user may hear an audio source should they be looking around a real-world conference room.

It may be appreciated that FIGS. 2-4 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
    establishing a virtual conference room and connections thereto by a speaking participant, an addressee participant, and a non-addressee participant;
    assigning the speaking participant, the addressee participant, and the non-addressee participant to positions in a virtual space;
    displaying a virtual output stream of the virtual space to a viewing participant on a user device display screen, wherein the viewing participant is selected from a group consisting of the speaking participant, the addressee participant, and the non-addressee participant, and wherein the virtual output stream comprises a schematic visual representation of the virtual space from the viewing participant's spatial perspective that is configured to be displayed in a two-dimensional viewport from a fixed perspective;
    determining that the speaking participant is directing a speech segment to the addressee participant; and
    altering the virtual output stream and an audio output stream for the viewing participant based at least on the positions of the speaking participant and the addressee participant, wherein the altering of the virtual output stream modifies a viewing direction of a virtual representation of each participant based on a gaze direction of the respective participant towards a representation of another participant on the user device display screen.

2. The method of claim 1, wherein the determining is based on at least one content element of speech of the speaking participant.

3. The method of claim 1, wherein the determining is based on detecting at least one gesture of the speaking participant.

4. The method of claim 1, wherein the determining is based on detecting a gaze of the speaking participant to the addressee participant.

5. The method of claim 1, wherein the altering further comprises:
    determining a first direction from the speaking participant to the addressee participant and a second direction from the speaking participant to the viewing participant based on each participant's position in the virtual space; and
    generating a viewing participant output audio stream by, at least, altering a speaking participant audio stream of the speech segment to include at least one of a first directional feature based on the first direction and a second directional feature based on the second direction.

6. The method of claim 5, wherein the generating is performed by altering the speaking participant audio stream based on at least one gesture of the speaking participant.

7. The method of claim 5, wherein generating the viewing participant output audio stream for a non-addressee participant is performed by altering the speaking participant audio stream to further include at least one clarity feature or at least one indirectness feature based on determining that the speaking participant is directing the speech segment to the addressee participant.

8. A computer system, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    establishing a virtual conference room and connections thereto by a speaking participant, an addressee participant, and a non-addressee participant;
    assigning the speaking participant, the addressee participant, and the non-addressee participant to positions in a virtual space;
    displaying a virtual output stream of the virtual space to a viewing participant on a user device display screen, wherein the viewing participant is selected from a group consisting of the speaking participant, the addressee participant, and the non-addressee participant, and wherein the virtual output stream comprises a schematic visual representation of the virtual space from the viewing participant's spatial perspective that is configured to be displayed in a two-dimensional viewport from a fixed perspective;
    determining that the speaking participant is directing a speech segment to the addressee participant; and
    altering the virtual output stream and an audio output stream for the viewing participant based at least on the positions of the speaking participant and the addressee participant, wherein the altering of the virtual output stream modifies a viewing direction of a virtual representation of each participant based on a gaze direction of the respective participant towards a representation of another participant on the user device display screen.

9. The computer system of claim 8, wherein the determining is based on at least one content element of speech of the speaking participant.

10. The computer system of claim 8, wherein the determining is based on detecting at least one gesture of the speaking participant.

11. The computer system of claim 8, wherein the determining is based on detecting a gaze of the speaking participant to the addressee participant.

12. The computer system of claim 8, wherein the altering further comprises:
   determining a first direction from the speaking participant to the addressee participant and a second direction from the speaking participant to the viewing participant based on each participant's position in the virtual space; and
   generating a viewing participant output audio stream by, at least, altering a speaking participant audio stream of the speech segment to include at least one of a first directional feature based on the first direction and a second directional feature based on the second direction.

13. The computer system of claim 12, wherein the generating is performed by altering the speaking participant audio stream based on at least one gesture of the speaking participant.

14. The computer system of claim 12, wherein generating the viewing participant output audio stream for a non-addressee participant is performed by altering the speaking participant audio stream to further include at least one clarity feature or at least one indirectness feature based on determining that the speaking participant is directing the speech segment to the addressee participant.

15. A computer program product, the computer program product comprising:
   one or more computer-readable tangible storage medium and program instructions stored on at least one of the one or more tangible storage medium, the program instructions executable by a processor capable of performing a method, the method comprising:
establishing a virtual conference room and connections thereto by a speaking participant, an addressee participant, and a non-addressee participant;
   assigning the speaking participant, the addressee participant, and the non-addressee participant to positions in a virtual space;
   displaying a virtual output stream of the virtual space to a viewing participant on a user device display screen, wherein the viewing participant is selected from a group consisting of the speaking participant, the addressee participant, and the non-addressee participant, and wherein the virtual output stream comprises a schematic visual representation of the virtual space from the viewing participant's spatial perspective that is configured to be displayed in a two-dimensional viewport from a fixed perspective;
   determining that the speaking participant is directing a speech segment to the addressee participant; and
   altering the virtual output stream and an audio output stream for the viewing participant based at least on the positions of the speaking participant and the addressee participant, wherein the altering of the virtual output stream modifies a viewing direction of a virtual representation of each participant based on a gaze direction of the respective participant towards a representation of another participant on the user device display screen.

16. The computer program product of claim 15, wherein the determining is based on at least one content element of speech of the speaking participant.

17. The computer program product of claim 15, wherein the determining is based on detecting at least one gesture of the speaking participant.

18. The computer program product of claim 15, wherein the determining is based on detecting a gaze of the speaking participant to the addressee participant.

19. The computer program product of claim 15, wherein the altering further comprises:
   determining a first direction from the speaking participant to the addressee participant and a second direction from the speaking participant to the viewing participant based on each participant's position in the virtual space; and
   generating a viewing participant output audio stream by, at least, altering a speaking participant audio stream of the speech segment to include at least one of a first directional feature based on the first direction and a second directional feature based on the second direction.

20. The computer program product of claim 19, wherein the generating is performed by altering the speaking participant audio stream based on at least one gesture of the speaking participant.

* * * * *